US010168223B2

(12) United States Patent
Leduc et al.

(10) Patent No.: US 10,168,223 B2
(45) Date of Patent: Jan. 1, 2019

(54) ELECTROMAGNETIC RADIATION DETECTOR ENCAPSULATED BY TRANSFER OF THIN LAYER

(71) Applicant: COMMISSARIAT A L'ENERGIE ATOMIQUE ET AUX ENERGIES ALTERNATIVES, Paris (FR)

(72) Inventors: Patrick Leduc, Grenoble (FR); Jean-Jacques Yon, Sassenage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/962,549

(22) Filed: Apr. 25, 2018

(65) Prior Publication Data

US 2018/0321087 A1    Nov. 8, 2018

(30) Foreign Application Priority Data

May 2, 2017    (FR) ...................... 17 53843

(51) Int. Cl.
*G01J 5/00*    (2006.01)
*G01J 5/20*    (2006.01)
*G01J 5/04*    (2006.01)

(52) U.S. Cl.
CPC .................. *G01J 5/20* (2013.01); *G01J 5/045* (2013.01)

(58) Field of Classification Search
CPC ..................................... G01J 5/04; G01J 5/045
See application file for complete search history.

(56) References Cited

U.S. PATENT DOCUMENTS

| 6,392,309 B1* | 5/2002 | Wataya ............... H01L 23/057 257/675 |
| 9,911,785 B2* | 3/2018 | Yon .......................... G01J 5/045 |
| 2004/0140570 A1 | 7/2004 | Higashi et al. |

(Continued)

FOREIGN PATENT DOCUMENTS

| EP | 1243903 A2 | 9/2002 |
| EP | 2172755 A1 | 4/2010 |

(Continued)

OTHER PUBLICATIONS

Preliminary French Search Report for Application No. FR 1753843, dated Feb. 19, 2018.

(Continued)

*Primary Examiner* — Kiho Kim
(74) *Attorney, Agent, or Firm* — Pearne & Gordon LLP (57) ABSTRACT

An electromagnetic radiation detector comprising: at least one membrane suspended above a substrate; and a cap, closing a hermetic cavity including the at least one membrane. According to the invention: the thickness of the cap is less than or equal to 10 μm; the cap bears at least on support walls surrounding the membrane(s); and the detector has first and second metallic sealing layers intercalated on each other between the cap and the support walls, and between which a peripheral bonding zone extends. The invention also relates to a method of making such a detector. The invention provides an encapsulation solution using a thin cap, in which the membranes are not subjected to high temperatures.

15 Claims, 5 Drawing Sheets

(56) References Cited

U.S. PATENT DOCUMENTS

| | | | |
|---|---|---|---|
| 2005/0211888 A1* | 9/2005 | Sato | H01L 27/14618 250/239 |
| 2006/0197215 A1* | 9/2006 | Potter | B81C 1/00269 257/704 |
| 2008/0079120 A1* | 4/2008 | Foster | B81B 7/007 257/619 |
| 2010/0284553 A1* | 11/2010 | Conti | B81B 7/0061 381/174 |
| 2010/0314544 A1* | 12/2010 | Ouvrier-Buffet | G01J 5/04 250/338.4 |
| 2011/0115036 A1* | 5/2011 | Moon | B81C 1/00269 257/415 |
| 2012/0097853 A1* | 4/2012 | Ouvrier-Buffet | G01J 5/02 250/349 |
| 2012/0153151 A1* | 6/2012 | Dumont | B82Y 20/00 250/338.1 |
| 2013/0249109 A1* | 9/2013 | Ma | B81C 1/00301 257/774 |
| 2013/0330878 A1* | 12/2013 | Ararao | H01L 21/56 438/107 |
| 2015/0177069 A1* | 6/2015 | Maes | G01J 5/023 374/121 |
| 2016/0245701 A1* | 8/2016 | Yon | G01J 5/34 |
| 2016/0247955 A1* | 8/2016 | Dumont | H01L 31/0203 |
| 2016/0285232 A1* | 9/2016 | Reinert | H01L 33/58 |
| 2017/0003172 A1* | 1/2017 | Maes | G01J 5/16 |
| 2017/0098638 A1 | 4/2017 | Thuaire et al. | |
| 2017/0207265 A1* | 7/2017 | Vilain | G01J 5/20 |
| 2017/0317137 A1* | 11/2017 | Yon | G01J 5/045 |

FOREIGN PATENT DOCUMENTS

| | | |
|---|---|---|
| EP | 2743659 A1 | 6/2014 |
| FR | 2966595 A1 | 4/2012 |
| WO | 95/17014 A1 | 6/1995 |

OTHER PUBLICATIONS

Y; Belliard et al., "Advance Toward Reliable High Density Cu—Cu Interconnects by Cu—SiO2 Direct Hybrid Bonding", 3D Systems Integration Conference (3DIC), 2014 International, IEEE.

U.S. Appl. No. 15/746,041; entitled "Method for Direct Bonding with Self-Alignment Using Ultrasound", filed Jan. 19, 2018.

* cited by examiner

ELECTROMAGNETIC RADIATION DETECTOR ENCAPSULATED BY TRANSFER OF THIN LAYER

CROSS-REFERENCE TO RELATED APPLICATIONS

This application claims priority from French Patent Application No. 17 53843 filed on May 2, 2017. The content of this application is incorporated herein by reference in its entirety.

DESCRIPTION

Technical Domain

The invention relates to the domain of encapsulation of the sensitive element(s) of an electromagnetic detector, to place this or these sensitive element(s) inside a closed cavity.

In this case each sensitive element is a membrane suspended above a substrate to absorb electromagnetic radiation and to convert it into heat.

The closed cavity, preferably under a vacuum, guarantees good thermal insulation between the membrane(s) and the substrate.

State of Prior Art

Different solutions are known in prior art to encapsulate the suspended membrane(s) of an electromagnetic detector of the microbolometer detector type.

Document US 2004/0140570 describes the deposition of a thick cap above the pixels of a matrix detector to close a cavity.

The thickness of the cap is 500 µm, with trenches in which this thickness is only 100 µm.

Gas evacuation openings are perforated in the cap, at the trenches.

However a cap of this type has several disadvantages.

Firstly, due to its large thickness, its transmission is reduced because part of the optical signal is absorbed in the crossing of the cap. This makes it necessary to use materials with high optical quality and that are therefore relatively expensive.

Secondly, the trenches must not be located above sensitive elements of the detector, to avoid disturbing detection.

Therefore they are positioned at the periphery of these sensitive elements which increases the total size of the detector with its cap.

Furthermore, because it is thick, the cap makes it more complicated to access the electrical connection pads called "bonding pads" located at the edge of detector pixels and making the connection with annex electronic devices. Access to the electrical connection pads is obtained only by etching the complete thickness of the cap. Apart from the difficulty in performing this etching step, the large thickness of the cap makes it necessary to position the bonding pads away from the edge of the cap so that the wire bonding (interconnection) step can be performed, which increases the size of the detector.

Other methods of making a cap are known, using deposition of a thin layer on a sacrificial layer surrounding the membranes of an electromagnetic detector of the microbolometer detector type.

Such a method is described for example in patent application FR 2 966 595.

A thinner cap can thus be obtained, without a trench.

However, one disadvantage of this solution is that the step of thin layer deposition can involve temperatures that could cause damage to sensitive elements of the detector.

One purpose of this invention is to disclose a solution for encapsulation of at least one suspended membrane of an electromagnetic radiation detector, that does not have the disadvantages of prior art.

PRESENTATION OF THE INVENTION

This objective is achieved with a method of encapsulating at least one sensitive element of an electromagnetic radiation detector, comprising the following steps:

a) fabrication of a stack, called the sensor stack, comprising:
  a first substrate, called the principal substrate;
  at least one membrane extending above the principal substrate, forming the at least one sensitive element of the electromagnetic radiation detector, and configured to absorb an incident electromagnetic radiation and convert it into heat;
  support walls extending above the principal substrate and surrounding the at least one membrane; and
  a first metallic sealing layer located above upper faces of the support walls, on the side opposite the principal substrate;

b) deposition of a layer called the cap layer, transparent in a spectral sensitivity range of the electromagnetic radiation detector and less than or equal to 10 µm thick, above a second substrate called the transfer substrate;

c) production of a second metallic sealing layer on the cap layer;

d) transfer of the transfer substrate onto the principal substrate, so as to align the first and second sealing layers and bond them to each other; and e) removing of the transfer substrate.

An electromagnetic radiation detector is thus made, comprising:
  at least one membrane, suspended above a substrate, configured to absorb incident electromagnetic radiation and convert it into heat; and
  a cap transparent in a spectral sensitivity range of the electromagnetic radiation detector, and closing a hermetic cavity containing the at least one membrane;

and in which:
  the thickness of the cap is less than or equal to 10 µm;
  the cap is suspended above the substrate, bearing on at least support walls surrounding the membrane(s); and
  the detector has first and second metallic sealing layers intercalated on each other between the cap and the support walls, and between which a peripheral bonding zone extends.

The substrate of the electromagnetic radiation detector corresponds to the principal substrate, mentioned in the statement of the method.

The basic concept of the invention is to make a cap by deposition of a thin layer on a transfer substrate, distinct from the substrate on which the membrane(s) of the electromagnetic radiation detector is (are) located.

Thus, no particular precautions are necessary for the deposition of a thin layer, since it is not made directly above the at least one membrane of the electromagnetic radiation detector.

Therefore the invention offers an encapsulation solution using a thin cap, in which the membrane(s) is (are) not subjected to high temperatures (the temperature remains below 400° C., or even below 300° C., during the implementation of the encapsulation method).

The thin layer in which the cap is made is not manipulated alone, but always together with the transfer substrate. It can thus be thinner, less than or equal to 10 μm thick and even more preferably less than or equal to 5 μm thick. This small thickness avoids absorption of the incident signal by the cap.

The small thickness of the cap makes it easy to make small openings, or vents, for the evacuation of gases, and does not require any trenches.

Furthermore, the electromagnetic radiation detector provides easy access to the electrical connection pads, and minimum size.

The method according to the invention uses bonding of a second sealing layer on a first sealing layer, to secure together the thin layer formed on the transfer substrate and the remaining part of the electromagnetic radiation detector. Therefore these two sealing layers, superposed and bonded to each other, are characteristic of the invention.

The detector and the method according to the invention may also have one or more of the characteristics mentioned in the dependent claims.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

In the following description, the terms "on", "above", "upper", "under", "below", "lower" relate to the orientation of the corresponding figures.

To clarify matters, the (Ox), (Oy) and/or (Oz) axes of an orthonormal coordinate system are shown on some of the figures.

Figure 1A:
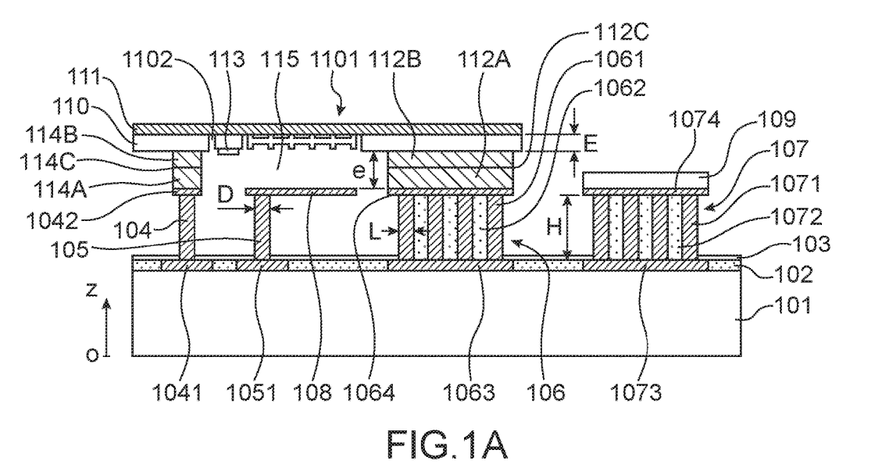
FIG. 1A diagrammatically illustrates a sectional view of a detail of a first embodiment of an electromagnetic radiation detector according to the invention.

FIG. 1A is a sectional view diagrammatically illustrating a detail of an electromagnetic radiation detector according to a first embodiment of the invention.

Figure 1B:
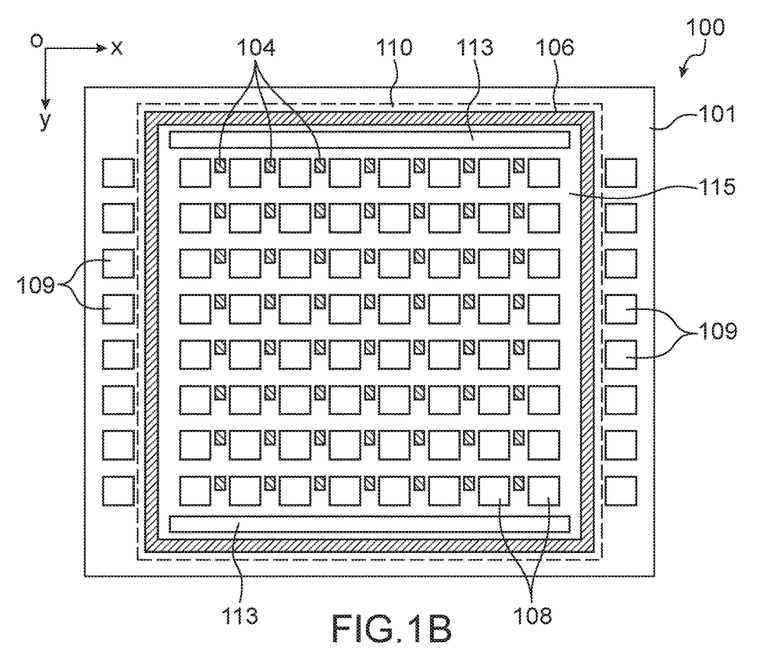
FIG. 1B is a diagrammatic illustration showing a top view of the detector of FIG. 1A.

FIG. 1B is a top view diagrammatically illustrating this detector.

The electromagnetic radiation detector 100 is an infrared or teraHertz detector operating at ambient temperature.

It comprises a substrate 101, for example made of silicon, in which read circuits are integrated for example using a CMOS technology.

The substrate 101 is covered with an optional intermediate layer 102 composed of an electrically insulating material.

The intermediate layer 102 in this case is covered with an optional thin protection layer 103 that protects the read circuits during a step in which the membrane is released, if necessary.

The detector 100 also comprises a matrix of membranes 108, each suspended above the substrate 101.

The membranes 108 are distributed in rows and columns above the substrate.

Each defines one pixel of the detector 100.

Each membrane 108 or suspended plate is composed of a material with high absorption in the infrared (wavelengths between 0.8 μm and 100 μm) and/or the terahertz range (wavelengths between 100 μm and 5 mm).

Each membrane is associated with a thermometric element (not shown) to measure its temperature.

The thermometric elements of the membranes 108 are electrically connected to the read circuits of the substrate 101.

Each thermometric element can be formed by a thermoresistive element adjoining the membrane, with an electric resistance that depends on the temperature.

The thermometric element and the membrane then together form the bolometric plate of a microbolometer.

As a variant, each thermometric element can be formed by a transistor or a diode adjoining the membrane, a current in this transistor or this diode depending on the temperature. The membrane can possibly form one of the elements of the transistor (or the diode).

The thermometric element together with the membrane then define the suspended plate of a sensor similar to a micro-bolometer, except that the temperature of the membrane results in a variation of a current in a transistor or in a diode, and not a variation of the resistance of a thermoresistive element.

Throughout the following, the expression "micro-bolometer type sensor" is used to designate one or the other of these variants.

Micro-bolometer type sensors will not be described in detail because they are well known to an expert in the subject.

Vertical structures extend in a stage located between the membranes 108 and the substrate 101. The structures are said to be vertical, because each extends along the (Oz) axis, orthogonal to the plane of the substrate 101. They comprise:
  support walls 106, to support a cap as described below;
  support pillars 104, also to support the cap;
  bearing pillars 105, to support membranes 108 as described below, and also used to electrically connect each membrane with read circuits in the substrate; and
  elevation blocks 107, on which electrical connection pads are formed.

In this case, the different vertical structures are all the same height along the vertical axis (Oz) and are composed of the same material or a same assembly of materials.

For example they may be composed of silicon, particularly amorphous silicon or a polysilicon, or a stack of metallic layers (titanium nitride and copper or titanium nitride and tungsten, etc.).

Each bearing pillar 105 has a diameter D of the order of one micrometer, for example between 0.4 μm and 1.5 μm, and particularly 1 μm.

Each has a horizontal base 1051 that extends in a plane parallel to the substrate, passing through the electrically insulating layer 102.

Each membrane bears on at least two bearing pillars 105.

The support walls 106 surround the membranes matrix 108.

In this case they comprise four vertical walls, delimiting a square or rectangular surface above the substrate 101. The number of walls can be increased so as to increase the number of salient angles between walls (angles of more than 90°) to avoid mechanical stresses in 90° angles). The support walls then delimit a polygon shaped surface.

In this case the support walls 106 comprise several elementary support walls 1061.

The elementary support walls 1061 delimit concentric surfaces nested into each other.

The so-called internal elementary walls 1061 located inside the structure forming the support walls 106 can delimit a surface in a discontinuously manner. On the other hand, the external elementary walls preferentially delimit a surface continuously.

The elementary walls 1061 are at a spacing from each other and each has a width L, for example equal to the diameter D.

The spaces between two neighbouring elementary walls 1061 are filled with a so-called sacrificial material 1062 that will not have been evacuated at the end of the fabrication steps of the detector 100 according to the invention.

As a variant, the support walls are not composed of elementary walls between which there is a sacrificial material, but rather of wide walls.

The support walls 106 also have a horizontal base 1063 and an upper plate 1064, each of which extends in a plane parallel to the substrate.

For example, the support pillars 104 may have the same section as the bearing pillars 105, or a smaller section.

In this case, each of them has a horizontal base 1041 and an upper plate 1042, each extending in a single piece in a plane parallel to the substrate.

The support pillars 104 extend inside the volume delimited by the support walls 106.

In this case they extend between the membranes 108, with the same distribution pitch P as the membranes, along each of the dimensions of the plane of the substrate. For example, this pitch may be between 5 µm and 17 µm, for example 10 µm.

There are Nx respectively Ny membranes, and Mx respectively My support pillars in each of the dimensions of the plane of the substrate, with for example Mx=Nx and My=Ny (one support pillar per pixel), or Mx=Nx-1 and My=Ny-1.

The distribution pitch of the support pillars 104 can also be a multiple of the pitch P of the membranes, equal to n(x)*P respectively n(y)*P along the x and y directions, where n(x) and n(y) are integer numbers. There are then Nx and Ny membranes, and Mx and My support pillars in each of the dimensions of the plane of the substrate, for example with Mx=Nx/n(x) and My=Ny/n(y) (one support pillar per n(x) respectively n(y) pixels along the directions x and y, respectively), or Mx=[Nx/n(x)]-1 and My=[Ny/n(y)]-1.

The support pillars 104 and the support walls 106 work together to support a cap 110.

The support pillars 104 are not strictly necessary for detectors with a small number of pixels (in other words, in this case a small number of membranes).

The elevation blocks 107 comprise several elementary walls or pillars 1071, for example each having a width or diameter equal to the diameter D.

The spaces between two elementary walls or pillars 1071 are filled with a so-called sacrificial material 1072 that will not have been evacuated at the end of the fabrication steps of the detector 100 according to the invention.

As a variant, the elevation blocks are not formed from elementary walls or pillars separated by a sacrificial material, but by a wide pillar with a diameter larger than D.

In this case, each of the elevation blocks 107 has a horizontal base 1073 and an upper plate 1074, each of which extends in a plane parallel to the substrate.

There is an electrical connection pad 109 on each of the elevation blocks 107, electrically connected to read circuits integrated into the substrate 101.

The electrical connection pads 109, or bonding pads, supply electrical connection points to the read circuits integrated into the substrate 101, for annex electronic circuits.

In this case, each electrical connection pad 109 extends in direct physical contact with the upper plate 1074 of an elevation block 107.

The electrical connection pads may for example be made of aluminium.

As illustrated on FIG. 1B, the electrical connection pads extend for example along two parallel columns located on each side of the membranes matrix, outside the volume delimited by the support walls 106. The electrical connection pads may also be present on the four sides of the matrix.

The cap 110 extends in a plane parallel to the substrate 101, and has a constant thickness E comprised between 0.5 µm and 10 µm including terminals, preferably between 0.5 µm and 5 µm including terminals, for example 2 µm.

The cap 110 is transparent at wavelengths detected by the bolometric type sensors of the detector 100. For example, its transmission coefficient may be greater than or equal to 70% at one wavelength at least detected by the detector 100.

Due to its small thickness, the cap can comply with this condition of transparency while being composed of a material with poor transmission properties. For example, it may be composed of a material other than a high quality silicon. Therefore the invention offers considerable freedom in the choice of cap materials, all the more so because the cap is deposited without temperature or conformity constraints (see below).

The cap 110 may for example be composed of silicon or germanium.

It extends above the membranes, without going above the connection pads 109. However, it can slightly project beyond the support walls 106. The external contours of the cap 110 are represented in dashed lines on FIG. 1B.

The cap may have textured regions 1101 positioned facing the membranes 108, for example made by lithography. These textures filter incident radiation or act as anti-reflection means for radiation so as to improve optical transmission to the membrane 108.

The cap 110 also comprises through openings 1102, or vents, or holes.

Each through opening 1102 may for example be rectangular or oblong in shape, in which the small dimension is less than 0.8 µm, for example about 0.5 µm. It is also possible, as described below, to provide circular through openings with a diameter of less than 0.8 µm, for example 0.5 µm.

They are distributed uniformly above the substrate, preferably following a pattern with the same distribution pitch P as the membranes, along each of the dimensions of the plane of the substrate.

Preferably, each pixel of the detector 100 comprises at least one through opening 1102.

The through openings 1102 allow in particular to evacuate a sacrificial material used for fabrication of the detector 100.

They are then closed off, in this case by a transparent closing layer 111 covering the cap (without covering the connection pads). The closing layer 111 then contributes to the hermetic sealing of the hermetic cavity 115.

The closing layer 111 may also perform an optical function, for example an anti-reflection or spectral filtering function.

According to variants not shown, thin layers, distinct from the closing layer 111, can extend above the cap 110, for example an anti-reflection treatment layer, and/or a spectral filter.

The through openings 1102 preferable extend facing the regions between the membranes 108.

This position prevents any degradation of membranes during a step to close the through openings 1102, since part of the closing material can drop on the membranes if these membranes are facing the through openings.

This position implies a distance between the membranes 108 equal to at least the diameter of a through opening 1102.

The diameter of a through opening 1102 may be very small, for example 0.5 µm, due to the small thickness of the cap 110. The minimum diameter of a through opening depends indeed on the thickness of the cap, the ratio of the thickness divided by said minimum diameter being about 10.

It is thus possible to obtain a high ratio of surface occupancy by the membranes 108, while having a small distribution pitch of the membranes, and through openings 1102 facing the spaces between the membranes.

The small diameter of a through opening can also avoid any optical disturbance of electromagnetic radiation to be detected, this diameter remaining small compared with wavelengths detected by the detector 100.

The detector 100 also comprises a first sealing layer 112A and a second sealing layer 112B.

The two sealing layers 112A, 112B are made of metal, and are superposed and bonded one to the other.

"Bonded" means fixed to each other for example by hybrid boding or bonding requiring melting of material.

This bonding forms a bonding zone 112C, said to be peripheral, between these two layers.

The two bonding layers 112A, 112B extend between the support wall 106 and the cap 110.

In particular, the first sealing layer 112A extends in direct physical contact with an upper face of the support wall 106, in this case an upper face of the upper plate 1064, on the side opposite the substrate 101.

The first sealing layer 112A extends along a closed loop path and delimits the same surface above the substrate 101 as that delimited by the support walls 106.

The second sealing layer 112B herein extends in direct physical contact with a lower face of the cap 110.

It is separating from the first sealing layer 112A only by the peripheral bonding zone 112C.

The peripheral bonding zone 112C may for example be composed of a thin metallic layer made of a metal different from the metal used in the first and second sealing layers, or a thin layer of metal of said sealing layers having melted during a bonding step. The two sealing layers may possibly be in direct physical contact with each other, the peripheral bonding zone corresponding simply to an interface between these two layers, bonded to each other without any intermediate bonding layer.

The second sealing layer 112B is superposed on the first sealing layer 112A, and extends along the same path.

Therefore it extends along a closed loop path and delimits the same surface above the substrate 101 as that delimited by the support walls 106.

The first and second sealing layers 112A, 112B together form a peripheral bead around the membranes 108.

They are made of metal, composed of a single metal or a metal alloy, or composed of a stack of metals or metal alloys. They comprise one or several metals such as for example copper, titanium nitride, tantalum nitride, nickel, gold, indium, tin or a tin-based alloy such as CuSn or AuSn. They are preferably both made of copper.

The combined thickness of the two sealing layers 112A, 112B is of the order of 2 µm.

In this case, this thickness is the distance between the membranes 108 and the cap 110, denoted "e" on FIG. 1A.

Similarly, the detector comprises pairs of first and second sealing pads 114A, 114B.

Each pair extends between the cap and a support pillar 104, and one of these pairs is mounted on top of each of the support pillars 104.

As mentioned with regard to the support pillars 104, these sealing pads are not strictly necessary for detectors with a small number of pixels.

For each pair, the first and second sealing pads 114A, 114B are superposed, and fixed to each other by bonding.

They have the same metallic composition as the two sealing layers.

They also have the same combined thickness as the two sealing layers.

The first and the second sealing pads 114A, 114B each have a section with a diameter approximately equal to the diameter of a support pillar, for example 1 µm, and in any case less than 3 µm.

Each first sealing pad 114A extends in direct physical contact with a support pillar 104, in particular an upper face of the upper plate 141 of this support pillar.

Each second sealing pad 114B extends in direct physical contact with the cap 110.

Each second sealing pad 114B is separated from the corresponding first sealing pad by an internal bonding zone 114C, with the same nature as the peripheral bonding zone 112C.

The cap is bearing on the first and second sealing layers 112A, 112B, themselves located on the support walls, and on the first and second sealing pads 114A, 114B, themselves located on the support pillars.

The first and second sealing layers 112A, 112B together with the support walls 106 define the lateral walls of a hermetic cavity 115 containing the membranes 108.

On the side opposite the substrate, this hermetic cavity 115 is closed by the cap 110.

The first and the second sealing layers 112A, 112B, participate in making the cavity 115 hermetic, in addition to their mechanical support function.

The vacuum is created in the hermetic cavity 115 using the through openings 1102 before they are closed by the layer 111.

The combined thickness of the first and second sealing layers, as mentioned above, is sufficient so that there is no problem in eliminating materials between the membrane and the cap by etching.

It should be noted that this thickness is also sufficiently small so that there is no technological difficulty in making the first and second sealing layers and the first and second sealing pads. This thickness is such that Chemical-Mechanical Polishing (CMP) processes, for example, can be used.

In this case, a getter material 113 is placed in contact with the cap 110, inside the cavity 115, to maintain the quality of the vacuum in the cavity 115 over time.

A getter material, or a gas trap, limits the appearance of gas in a chamber. It can be an easily oxidisable metal such as titanium, or vanadium, zirconium, cobalt, iron, manganese, aluminium or an alloy of these metals.

The getter material 113 extends in the cavity 115.

For example, it forms two bars parallel to each other, extending along two opposite edges of the matrix of membranes, the connection pads 109 extending along two other edges of the matrix of membranes. This example is not limitative. The getter material may also be positioned, for example, on the side of the substrate.

For illustration purposes, the getter material is not positioned in this manner in FIG. 1A, so that the connection pads 109 can be illustrated at the same time.

The detector 100 can detect an electromagnetic radiation propagating orthogonal to the plane of the substrate 101, and incident on the membranes from the side opposite the substrate 101.

Figure 2A:
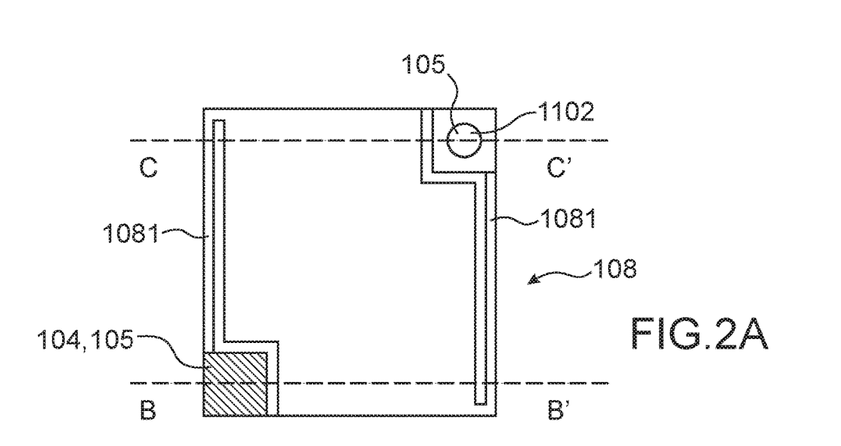
FIGS. 2A to 2C diagrammatically illustrate a pixel in a second embodiment of a detector according to the invention, in which the positions of a vent for evacuating a sacrificial layer and of a cap support pillar are particularly ingenious.
Figure 2B:
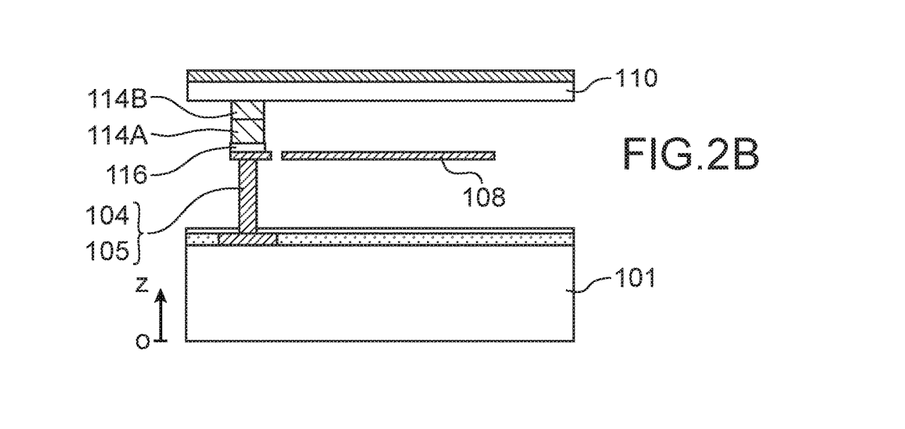
Figure 2C:
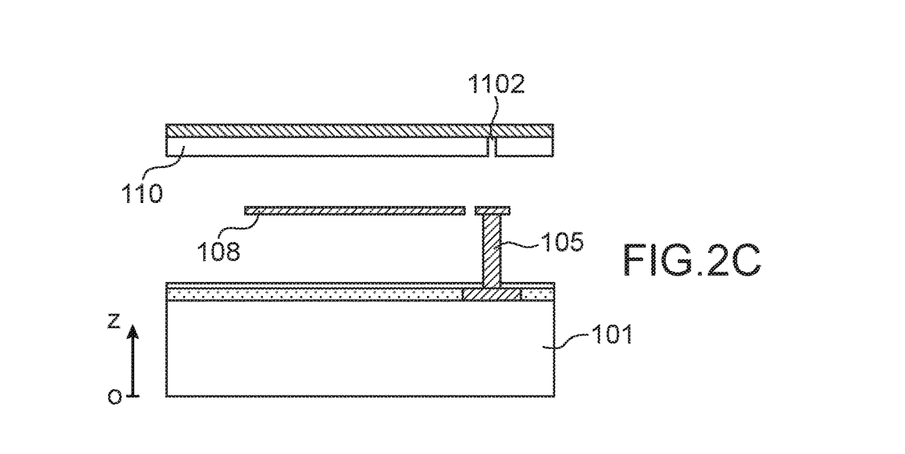

FIGS. 2A to 2C illustrate a second embodiment of a detector according to the invention.

FIG. 2A is a top view diagrammatically representing one pixel of such a detector.

Each pixel receives a single membrane 108, supported on two bearing pillars 105.

FIG. 2B shows a simplified sectional view of this pixel, in a vertical plane BB' passing through a first bearing pillar 105.

FIG. 2C shows a simplified sectional view of this pixel, in a vertical plane CC' parallel to plane BB' and passing through the other bearing pillar 105.

According to this second embodiment, in each pixel, one of the bearing pillars 105 for the membrane also forms a support pillar 104 to support the cap 110.

In practice, a first and a second sealing pad 114A, 114B are simply mounted on top of one of the bearing pillars 105, as described above.

Preferably, all the support pillars under the cap also form a bearing pillar for a membrane.

Thus, a ratio of surface filling by the membranes 108 is not limited by the dimensions of the support pillars 104 distinct from the bearing pillars for the membrane.

According to this embodiment, electrical insulation is necessary to prevent an electrical connection of the membranes 108 through the cap 110 and pairs of first and second sealing pads 114A, 114B.

Therefore there is an electrical insulation pad 116 facing each pair of first and second sealing pads 114A, 114B.

In this case, a corresponding insulation pad 116 is underneath each pair of first and second sealing pads 114A, 114B. The insulation pad 116 in this case extends between the support pillar 104 (and also the bearing pillar) and the first sealing pad. According to one variant not shown, the insulation pad 116 extends between the cap 110 and the second sealing pad 114B.

The insulation pad 116 may for example be made of a dielectric material, for example SiC, SiCN, SiOC, $Al_2O_3$, AlN, etc. It is preferably a material resistant to etching made to evacuate a sacrificial layer during fabrication of the detector, and particularly a material resistant to etching by hydrofluoric acid (HF) vapour.

According to the second embodiment illustrated on FIGS. 2A to 2C, each pixel comprises a single vent 1102 located above the other of the bearing pillar 105 supporting the membrane 108.

The vent, or through opening 1102, does not project laterally beyond the support pillar, this being possible due to the small diameter of the vent, itself possible due to the small value of the cap thickness.

In particular, the diameter of the bearing pillar 105 is of the order of 1 µm. The vent diameter is of the order of 0.5 µm, and the precision of the alignment between the two may be less than 0.2 µm.

The membrane 108 is suspended bearing on the bearing pillars 105, through arms 1081 that extend laterally, parallel to the plane of the substrate 101. Consequently, each through opening 1102 thus positioned does not extend facing a membrane.

This position of the through openings 1102 allows the ratio of surface filling by the membranes 108 not being limited by the presence of through openings 1102.

According to variants not shown, the detector may have only the characteristic relative to the position of the through openings, or only the characteristic relative to the support pillars.

Figure 3A:
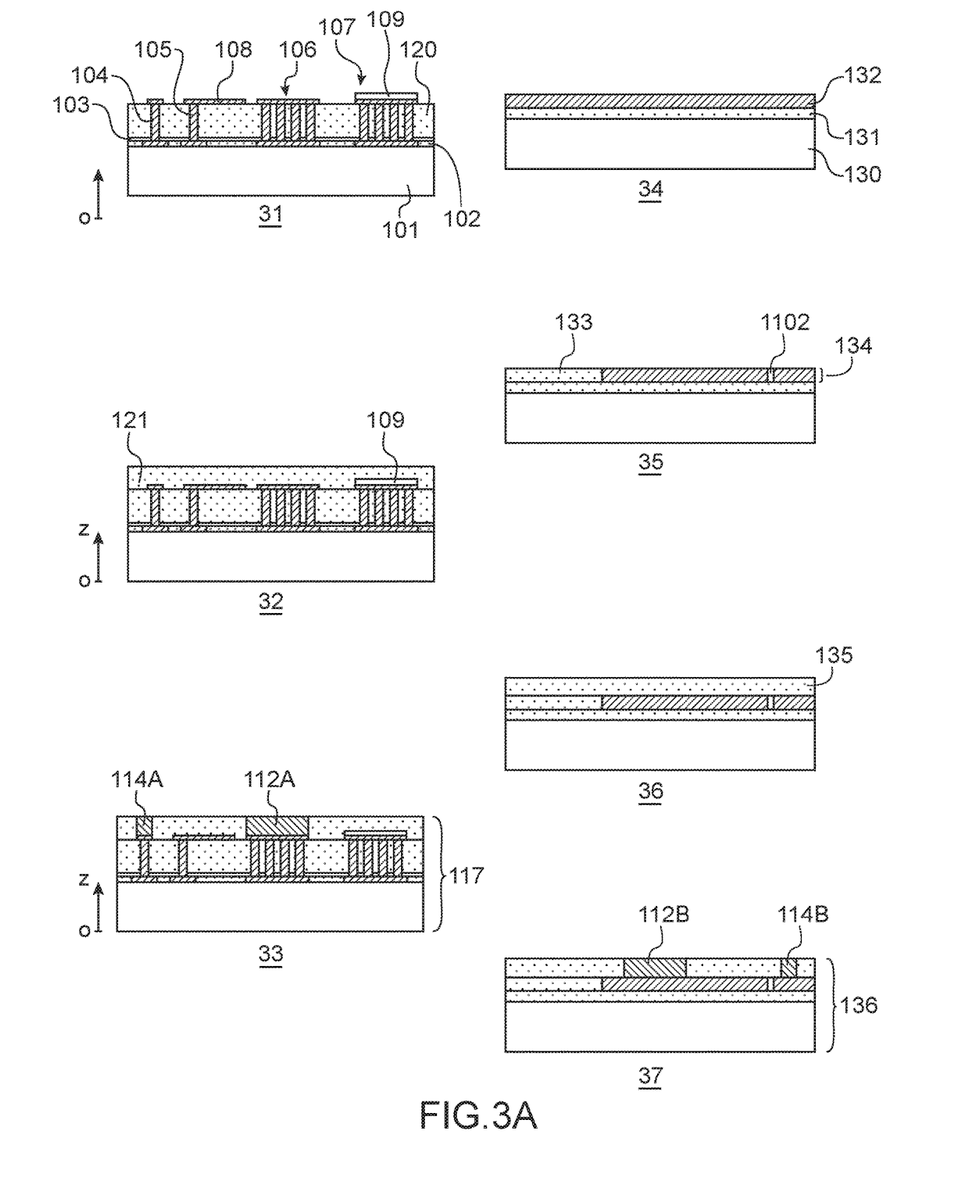
FIGS. 3A and 3B illustrate the steps of a method according to the invention, for fabricating an electromagnetic radiation detector according to the invention.
Figure 3B:
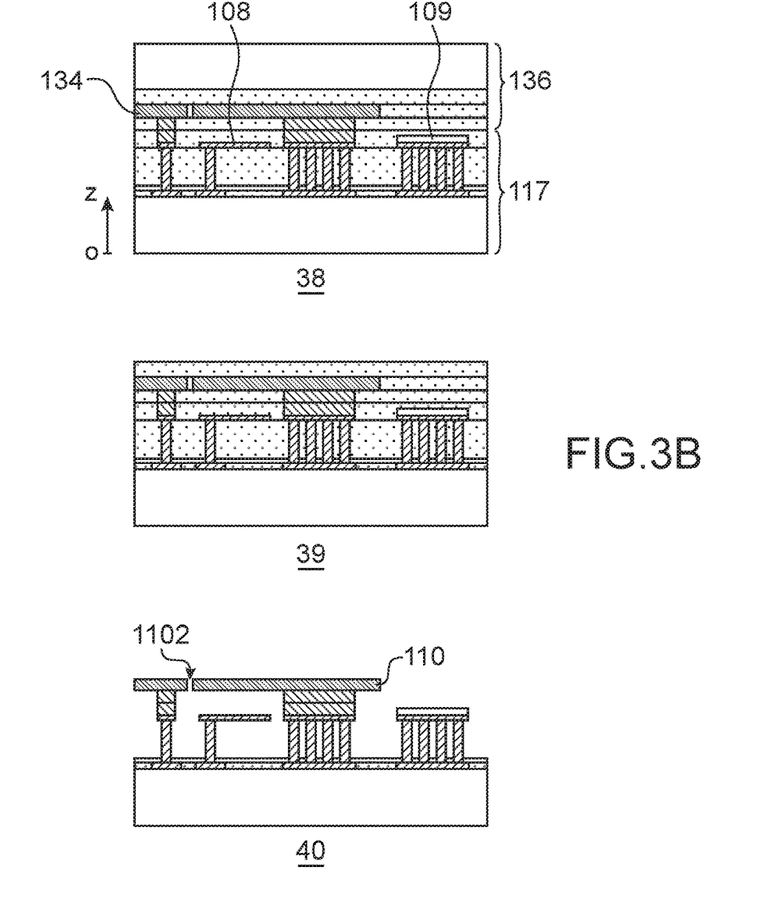

FIGS. 3A and 3B illustrate the steps in a method of fabricating a detector according to the invention.

The left shows the steps used above a first substrate called the principal substrate 101, corresponding to the substrate as described with reference to FIG. 1.

In a first step 31, a stack is made comprising the following, superposed on each other:
- the principal substrate 101, comprising read circuits;
- the intermediate layer 102, as described with reference to FIG. 1A;
- the protection layer 103, as described with reference to FIG. 1A;
- the different vertical structures as described with reference to FIG. 1A (bearing pillars 105, support pillars 104, support walls 106, and elevation blocks 107), formed in a sacrificial layer 120 called the membrane sacrificial layer; and
- the membranes 108 and the connection pads 109 as described with reference to FIG. 1A.

The vertical structures are formed by etching trenches in the sacrificial layer 120, and depositing material for filling the trenches.

The support walls 106 and the elevation blocks can each be formed by etching several trenches in the sacrificial layer 120, to finally obtain structures as described with reference to FIG. 1A. The result is that structures wider than the support pillars and bearing pillars can be obtained, using the same etching step as for said pillars.

The sacrificial layer 120 extends above the principal substrate 101 up to the height of the lower faces of the membranes 108, on the side opposite the principal substrate 101.

The membranes 108 are made by lithography and etching, above the sacrificial layer 120.

Production of the stack will not be described further herein, because it corresponds to known steps in the fabrication of a bolometric type detector, except that other vertical structures are made in addition to the bearing pillars for the membranes.

The next step is to deposit a new sacrificial layer called the first sacrificial stop layer 121, covering the membranes 108 and the connection pads 109 (step 32).

In a step 33, the first sacrificial stop layer 121 is then etched above the support pillars 104 and the support walls 106, and the etched openings are filled with metal to form the first sealing pads 114A and the first sealing layer 112A.

The method for making the first sealing pads and the first sealing layer 112A, 114A make use of processes called damascene processes, with a metal deposit followed by planarisation to obtain pads and layers flush with the surface of the first sacrificial stop layer 121, on the side opposite the substrate 101.

The stack obtained at the end of step 33 is called the sensor stack 117.

A second series of steps involving a second substrate called the transfer substrate 130 is implemented independently of steps 31 to 33.

The transfer substrate 130 may for example be made of silicon or glass, and does not comprise any integrated circuit.

In step 34, an intermediate sacrificial layer 131 is deposited on the substrate 130, then a layer called the cap layer 132 is deposited on the intermediate sacrificial layer 131.

The material and the thickness of the cap layer correspond to the material and the thickness of the cap described with reference to FIG. 1A.

As a variant, the layers 130, 131 and 132 can be derived from an SOI (silicon on insulator) or GOI (germanium on insulator) substrate.

In step 35, the cap layer 132 is etched, and then a new sacrificial layer called the cap sacrificial layer 133 is deposited to fill the openings etched in the cap layer 132.

The cap layer 132 is then etched when it extends above the cap sacrificial layer and not above the membranes 108. Etching residue is thus prevented from dropping on the membranes 108 and on the connection pads 109.

Etching consists in delimiting the external contours of the cap as described with reference to FIG. 1A, and forming the through openings 1102 in the cap.

In particular, a cap is delimited, configured to not cover the connection pads 109 at the end of the steps to fabricate the detector according to the invention.

The cap sacrificial layer 133 and the etched cap layer together form a plane surface on the side opposite the transfer substrate 130.

Therefore, at the end of step 35, a layer 134 has been formed above the transfer substrate 130, layer 134 comprising regions made of a sacrificial material and cap regions transparent at wavelengths to be detected.

Regions made of a sacrificial material are intended to form through openings in the cap, respectively access regions for access to the connection pads 109.

In a step 36, a second sacrificial stop layer 135 is deposited above the layer 134.

In a step 37, the second sacrificial stop layer 135 is etched at the locations of the second sealing layer and the second sealing pads as described with reference to FIG. 1A, and the etched openings are then filled with metal to form said pads and layer 114B, 112B.

Once again, damascene processes known to an expert in the subject are used to obtain pads and a layer flush with the surface of the second sacrificial stop layer 135, on the side opposite the transfer substrate 130.

The etched openings are positioned so as to be above the first sealing layer or the first sealing pads respectively, when the transfer substrate is turned over and placed above the principal substrate 101.

The stack obtained after step 37 is called the transfer stack 136.

Firstly steps 31 to 33, and secondly steps 34 to 37, can be implemented in parallel, or one after the other, with steps 31 to 33 first or steps 34 to 37 first.

The different sacrificial layers are preferably made of a dielectric material, and particularly silicon dioxide $SiO_2$.

The two sacrificial stop layers define the height of the sealing layers and pads 114A, 112A, 114B, 112B. They also act as a stop layer for damascene processes, and participate in the definition of a plane mechanical support for later transfer of the cap.

FIG. 3B illustrates subsequent steps in the process.

In step 38, the transfer stack 136 is turned over and is deposited on the sensor stack 117, such that the first and second sealing layers 112A, 112B, and the first and second sealing pads 114A, 114B, are aligned in pairs and in direct physical contact in pairs.

The layer 134 as described above extends above the sensor stack 117 such that the cap regions extend above the membranes 108, and the regions made of a sacrificial material extend above the connection pads 109 and at the locations of the future through openings in the cap.

The alignment precision is of the order of 0.2 μm.

The sensor stack 117 and the transfer stack 136 are fixed together by bonding without an intermediate adhesive layer, called "hybrid bonding".

The attachment makes use of attractive forces such as Van der Waals forces and hydrogen bonds.

The attachment does not necessarily require high temperature heating. In particular, the temperature remains strictly below 300° C.

This bonding is said to be "hybrid" because it involves the material in the first and second sacrificial stop layers, and also the material in the sealing layers and pads 112A, 112B, 114A, 114B.

Copper to copper and silicon dioxide to silicon dioxide hybrid bonding is known to an expert in the subject, and will not be described further in the following.

If necessary, the expert in the subject can refer for example to the following paper: «*Advance Toward Reliable High Density Cu—Cu Interconnects by Cu—SiO2 Direct Hybrid Bonding*», Y Beilliard & al., published in 3D Systems Integration Conference (3DIC), 2014 International, IEEE.

In a step 39, the transfer substrate 130 is removed for example by mechanical polishing (grinding) and wet etching. The intermediate sacrificial layer 131 is also used as a stop layer for etching the transfer substrate 130.

Then, in step 40, the different sacrificial layers are etched, in this case by etching with hydrofluoric acid in the vapour phase, and are evacuated.

The following in particular are etched:
- the intermediate sacrificial layer 131, formed in step 34;
- the cap sacrificial layer 133, formed in step 35;
- the first and second sacrificial stop layers 121, 135, formed in steps 32 and 36 respectively; and
- the membrane sacrificial layer 120, formed in step 31.

All these sacrificial layers are etched and evacuated, except possibly portions of the membrane sacrificial layer 120 located between elementary walls of the support walls, and between elementary walls or pillars of the elevation blocks.

In particular, the cap sacrificial layer is etched so that only the cap remains. In other words, the regions of sacrificial material located above the connection pads, and the sacrificial material located in the through openings 1102, are eliminated.

The portions of sacrificial layers located under the cap 110 are etched and evacuated through the openings 1102 formed in the cap 110.

Thus, a same step of etching and evacuating sacrificial material allows releasing space under the cap, above and below the membranes, and releasing regions above the connection pads.

The method then includes classical steps, not shown, for creating a vacuum, and for deposition of a closing layer on the cap to close the through openings 1102.

A getter material, not shown, can be deposited on the layer 134, before the substrate transfer step 38. This getter material must be covered by a protection layer when the sacrificial layers are etched, and the protection layer can then be removed.

Steps to create the texture and/or to deposit treatment layers (optical filter, anti-reflection, etc.) can be implemented on the cap before the substrate transfer step 38 and/or after step 39 in which the substrate 130 is removed.

Although this example is not limitative, the invention preferably relates to a detector made using inorganic (mineral) sacrificial layers etched by hydrofluoric acid vapour.

Therefore according to the invention, the cap is deposited above a transfer substrate rather than directly above sensitive elements. Consequently, a deposition temperature of the thin layer forming the cap should not damage these sensitive elements. Therefore the choice of materials that can be used in the sensor is not limited by a deposition temperature. In particular, there is no need to restrict the choice to materials with a low deposition temperature, for example less than 400° C. or even less than 300° C.

The cap according to the invention is made by depositing a layer on a plane surface. Thus, the choice of material(s) from which the cap is made is no longer limited by a conformity requirement related to a non-plane deposition surface.

Figure 4:
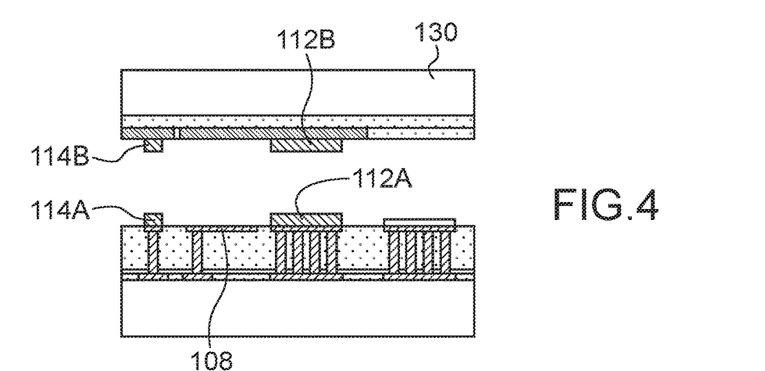
FIGS. 4 and 5 illustrate two variants of the method illustrated in FIGS. 3A et 3B.

FIG. 4 illustrates a variant of the method illustrated in FIGS. 3A and 3B in which, during the transfer step of the substrate 130 above the membranes 108, the first sealing layer and pads 112A, 114A are not surrounded by a sacrificial material and are surrounded by the surrounding gas environment.

In the same way, during this step in which the substrate 130 is transferred, the second layer and sealing pads 112B, 114B are not surrounded by sacrificial material and are surrounded by the surrounding gas environment.

In this case, bonding between sealing layers and between sealing pads is not a hybrid bonding, but classical bonding by fusion or thermocompression, using indium or tin pads.

However, it is still bonding without heating to 300° C. or more.

This variant, less preferred, may be advantageous particularly when the membrane sacrificial layer and the cap sacrificial layer are formed by an organic material such as polyimide, and then etched by oxygen plasma.

According to another variant, not illustrated, the membrane sacrificial layer is evacuated before transfer of the substrate 130.

Figure 5:
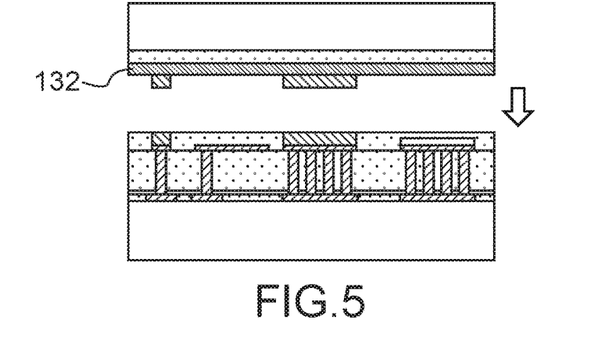

FIG. 5 illustrates another variant of the method in which the cap layer 132 is not etched before the transfer step of the substrate 130, but after removal of this substrate.

Figure 6A:
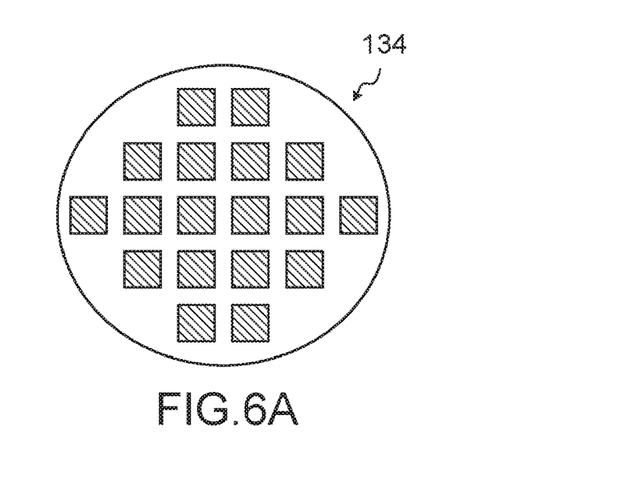
FIGS. 6A and 6B illustrate the use of a method according to the invention, to fabricate several detectors according to the invention simultaneously.
Figure 6B:
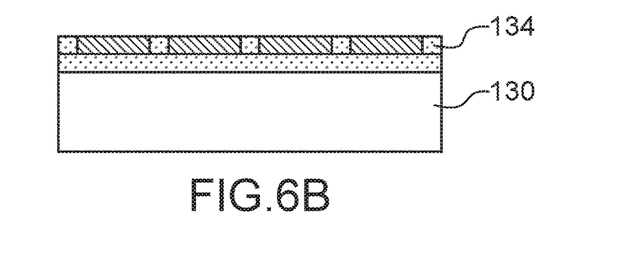

Finally, FIGS. 6A and 6B diagrammatically illustrate the simultaneous fabrication of several detectors according to the invention.

FIG. 6A is a top view illustrating a layer 134 comprising regions made of a sacrificial material and cap regions, together delimiting a matrix of caps. Each cross-hatched zone corresponds to a transparent cap.

FIG. 6B is a sectional view illustrating a stack comprising a transfer substrate 130, an intermediate sacrificial layer and said layer 134.

Thus, several transfer stacks as described above are made, sharing the same transfer substrate, and deposited together above several sensor stacks sharing the same principal substrate.

The alignment between the principal substrate and the transfer substrate is made once only, to fabricate several detectors according to the invention.

Therefore the invention provides an ingenious hermetic packaging solution for an electromagnetic radiation detector with suspended membrane(s).

This is a so-called "wafer level" packaging in which, when the detector comprises several membranes, said several membranes are encapsulated together in the same hermetic cavity.

The invention is particularly advantageous in the framework of suspended membranes made using an inorganic (mineral) sacrificial layer released by HF etching.

The invention is not limited to the examples described herein, and many variants can be used without going outside the framework of the invention.

For example, the number of support pillars under the cap can be adjusted as a function of the stiffness of the cap and the height of the cavity under the cap.

The detector according to the invention does not necessarily have any support pillars nor first and second sealing pads, particularly if the cap is sufficiently stiff considering its lateral dimensions.

The detector 100 according to the invention can form an infrared imager, a thermal imager (thermography), an infrared sensor (that may then comprise only a single pixel), a tera-Hertz sensor, a gas detector (by measuring an optical absorption in the infrared spectrum), a persons or objects detector, an instrument for recognising persons or objects, a movement detector in the infrared spectrum (for example to detect human activity), etc.

The invention claimed is:

1. Electromagnetic radiation detector (100) comprising:
   at least one membrane (108) suspended above a substrate (101), configured to absorb incident electromagnetic radiation and convert it into heat; and
   a cap (110) transparent in a spectral sensitivity range of the electromagnetic radiation detector, and closing a hermetic cavity (115) containing the at least one membrane;
   characterised in that:
   the thickness (E) of the cap (110) is less than or equal to 10 µm;
   the cap is suspended above the substrate, bearing on at least support walls (106) surrounding the membrane(s);
   the detector (100) has first and second metallic sealing layers (112A, 112B) intercalated on each other between the cap and the support walls, and between which a peripheral bonding zone (112C) extends.

2. Detector (100) according to claim 1, characterised in that:
   the cap (110) is suspended above the substrate, bearing on support walls (106) and on support pillars (104) located between the support walls; and
   the detector comprises pairs of first and second metallic sealing pads (114A, 114B), each pair being located between the cap and one of the support pillars (104), the first and second sealing pads of each pair being superposed and separated by a corresponding internal bonding zone (114C).

3. Detector (100) according to claim 2, characterised in that it comprises a plurality of membranes (108) suspended above the substrate, a membrane distribution pitch (P) being equal to a distribution pitch of the support pillars (104), in each dimension of the plane of the substrate.

4. Detector (100) according to claim 2, characterised in that the membrane(s) (108) is (are) suspended above the substrate, each bearing on bearing pillars (105), and in that for each membrane, a pair of first and second sealing pads (114A, 114B) is located on one of the bearing pillars, such that said bearing pillar also forms a support pillar (104) for the cap.

5. Detector (100) according to claim 1, characterised in that the cap (1110) has one or several through openings (1102) and in that a closing layer (111) covers the cap.

6. Detector (100) according to claim 5, characterised in that the membrane(s) (108) is (are) suspended above the substrate, each bearing on bearing pillars (105), and in that for each membrane, there is a through opening (1102) in the cap above one of the bearing pillars (105).

7. Detector (100) according to claim 1, characterised in that the combined thickness of the first and second sealing layers (112A, 112B) is between 1.5 µm and 2.5 µm.

8. Method of encapsulating at least one sensitive element of an electromagnetic radiation detector (100), characterised in that it comprises the following steps:

a) fabrication of a stack, called the sensor stack (117), comprising:

a first substrate (101), called the principal substrate;

at least one membrane (108) extending above the principal substrate, forming the at least one sensitive element of the electromagnetic radiation detector, and configured to absorb an incident electromagnetic radiation and convert it into heat;

support walls (106) extending above the principal substrate and surrounding the at least one membrane; and a first metallic sealing layer (112A) located above upper faces of the support walls, on the side opposite the principal substrate;

b) deposition of a layer called the cap layer (132), transparent in a spectral sensitivity range of the electromagnetic radiation detector and less than or equal to 10 µm thick, above a second substrate (130) called the transfer substrate;

c) production of a second metallic sealing layer (112B) on the cap layer;

d) transfer of the transfer substrate (130) onto the principal substrate (101), so as to align the first sealing layer (112A) and the second sealing layer (112B) and bond them to each other; and e) removing of the transfer substrate (130).

9. Method according to claim 8, characterised in that:

the sensor stack (117) also comprises support pillars (104), extending between the support walls, each with a corresponding first sealing pad (114A) on top of it;

step c) also comprises production of second sealing pads (114B) on the cap layer; and step d) also includes alignment and bonding of first sealing pads (114A) with second sealing pads (114B), in pairs.

10. Method according to claim 8, characterised in that it also comprises a step to etch the cap layer (132), to delimit the external contour of a cap (110) designed to close a cavity containing the at least one membrane, and to form at least one through opening (1102) in this cap.

11. Method according to claim 10, characterised in that the step to etch the cap layer is implemented after the step e) to remove the transfer substrate.

12. Method according to claim 10, characterised in that:

the step to etch the cap layer is implemented after step b) to deposit the cap layer (132) and before step d) to transfer the transfer substrate (130);

the step to etch the cap layer is followed by a step to fill the etched regions with a layer of sacrificial material, called a cap sacrificial layer (133); and the cap sacrificial layer (133) is evacuated after step e) to remove the transfer substrate.

13. Method according to claim 8, characterised in that:

the method comprises steps to deposit layers of sacrificial material, called sacrificial stop layers (121, 135), such that before step d) to transfer the transfer substrate, the first sealing layer (112A) and the second sealing layer (112B) are each located in one of these sacrificial stop layers;

step d) uses hybrid bonding; and the sacrificial stop layers (121, 135) are evacuated after step e) to remove the transfer substrate.

14. Method according to claim 8, characterised in that in the sensor stack (117) after step a), the at least one membrane (108) extends above a sacrificial material layer, called the membrane sacrificial layer (120), the membrane sacrificial layer being evacuated after step e) to remove the transfer substrate.

15. Method according to claim 8, characterised in that it is implemented for several sensor stacks (117) sharing the same principal substrate (101) simultaneously, and using a single transfer substrate (130) and a single cap layer (132), a step to etch the cap layer delimiting the external contours of several caps (110) each intended to cover one of the several sensor stacks.

* * * * *